US012317301B2

(12) United States Patent
Marzban et al.

(10) Patent No.: US 12,317,301 B2
(45) Date of Patent: May 27, 2025

(54) MULTI-HEAD MACHINE LEARNING MODEL FOR ESTIMATING A PLURALITY OF PARAMETER VALUES

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 674 days.

(21) Appl. No.: 17/652,854

(22) Filed: Feb. 28, 2022

(65) Prior Publication Data

US 2023/0276480 A1   Aug. 31, 2023

(51) Int. Cl.
*H04W 72/08* (2009.01)
*G06N 3/08* (2023.01)
*H04W 72/54* (2023.01)

(52) U.S. Cl.
CPC .............. *H04W 72/54* (2023.01); *G06N 3/08* (2013.01)

(58) Field of Classification Search
CPC ...... G06N 3/0475; G06N 3/084; G06N 3/063; G06N 3/09; G06N 3/048; G06N 3/08; G06N 3/0455; G06N 3/045; H04L 25/0254; H04L 5/0007; H04L 25/03955; H04L 25/03898; H04L 25/0224; H04B 1/40; H04B 1/0003; H04B 7/0626
See application file for complete search history.

(56) References Cited

U.S. PATENT DOCUMENTS

| | | | |
|---|---|---|---|
| 2020/0366537 A1* | 11/2020 | Wang | ................... H04B 7/0626 |
| 2021/0076267 A1 | 3/2021 | Cirkic et al. | |
| 2021/0111794 A1* | 4/2021 | Huang | ............... H04B 10/2507 |
| 2021/0153219 A1* | 5/2021 | Sana | ..................... H04W 24/02 |
| 2021/0185515 A1 | 6/2021 | Bao et al. | |

(Continued)

OTHER PUBLICATIONS

International Search Report and Written Opinion—PCT/US2023/060480—ISA/EPO—Jun. 2, 2023.

(Continued)

*Primary Examiner* — Jung Liu
(74) *Attorney, Agent, or Firm* — Harrity & Harrity, LLP\Qualcomm

(57) ABSTRACT

Various aspects of the present disclosure generally relate to wireless communication. In some aspects, a first network node may receive a signal associated with a set of resources. The first network node may determine, using a multi-head machine learning model having a body module and a plurality of head modules, a plurality of estimated parameter values of a plurality of parameters corresponding to the set of resources, wherein the body module extracts a set of common features based at least in part on a set of model inputs corresponding to the set of resources, and wherein the plurality of head modules generate the plurality of estimated parameter values based at least in part on the set of common features. The first network node may perform a wireless communication operation based at least in part on the plurality of estimated parameter values. Numerous other aspects are described.

30 Claims, 9 Drawing Sheets

(56) References Cited

U.S. PATENT DOCUMENTS

2021/0314197 A1* 10/2021 Ding .................... G06N 3/084
2021/0326701 A1   10/2021 Bai
2021/0351885 A1   11/2021 Chavva et al.
2021/0376895 A1   12/2021 Xue et al.
2022/0014398 A1*  1/2022 Andrews ............. G06N 3/0475

OTHER PUBLICATIONS

Partial International Search Report—PCT/US2023/060480—ISA/EPO—Apr. 21, 2023.
Vaswani A., et al., "Attention Is All You Need", arXiv:1706.03762v1, Jun. 12, 2017, XP055888207, pp. 1-15.

* cited by examiner

MULTI-HEAD MACHINE LEARNING MODEL FOR ESTIMATING A PLURALITY OF PARAMETER VALUES

FIELD OF THE DISCLOSURE

Aspects of the present disclosure generally relate to wireless communication and to techniques and apparatuses for a multi-head machine learning model for estimating a plurality of parameter values.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first network node for wireless communication. The first network node may include a memory and one or more processors coupled to the memory. The one or more processors may be configured to receive a signal associated with a set of resources. The one or more processors may be configured to determine, using a multi-head machine learning model having a body module and a plurality of head modules, a plurality of estimated parameter values of a plurality of parameters corresponding to the set of resources, wherein the body module extracts a set of common features based at least in part on a set of model inputs corresponding to the set of resources, and wherein the plurality of head modules generate the plurality of estimated parameter values based at least in part on the set of common features. The one or more processors may be configured to perform a wireless communication operation based at least in part on the plurality of estimated parameter values.

Some aspects described herein relate to a first network node for wireless communication. The first network node may include a memory and one or more processors coupled to the memory. The one or more processors may be configured to transmit, to a second network node, a machine learning configuration associated with a multi-head machine learning model having a body module and a plurality of head modules, wherein the multi-head machine learning model is configured to determine a plurality of estimated parameter values of a plurality of parameters corresponding to a set of resources, wherein the body module is configured to extract a set of common features based at least in part on a set of model inputs corresponding to the set of resources, and wherein the plurality of head modules are configured to generate the plurality of estimated parameter values based at least in part on the set of common features. The one or more processors may be configured to receive, from the second network node, an output report that indicates at least one of the plurality of estimated parameter values.

Some aspects described herein relate to a method of wireless communication performed by a first network node. The method may include receiving a signal associated with a set of resources. The method may include determining, using a multi-head machine learning model having a body module and a plurality of head modules, a plurality of estimated parameter values of a plurality of parameters corresponding to the set of resources, wherein the body module extracts a set of common features based at least in part on a set of model inputs corresponding to the set of resources, and wherein the plurality of head modules generate the plurality of estimated parameter values based at least in part on the set of common features. The method may include performing a wireless communication operation based at least in part on the plurality of estimated parameter values.

Some aspects described herein relate to a method of wireless communication performed by a first network node. The method may include transmitting, to a second network node, a machine learning configuration associated with a multi-head machine learning model having a body module and a plurality of head modules, wherein the multi-head machine learning model is configured to determine a plurality of estimated parameter values of a plurality of parameters corresponding to a set of resources, wherein the body module is configured to extract a set of common features based at least in part on a set of model inputs corresponding to the set of resources, and wherein the plurality of head modules are configured to generate the plurality of estimated parameter values based at least in part on the set of common features. The method may include receiving, from the second network node, an output report that indicates at least one of the plurality of estimated parameter values.

Some aspects described herein relate to a non-transitory computer-readable medium that stores a set of instructions for wireless communication by a first network node. The set of instructions, when executed by one or more processors of the first network node, may cause the first network node to receive a signal associated with a set of resources. The set of instructions, when executed by one or more processors of the first network node, may cause the first network node to determine, using a multi-head machine learning model having a body module and a plurality of head modules, a plurality of estimated parameter values of a plurality of parameters corresponding to the set of resources, wherein the body module extracts a set of common features based at least in part on a set of model inputs corresponding to the set of resources, and wherein the plurality of head modules generate the plurality of estimated parameter values based at least in part on the set of common features. The set of instructions, when executed by one or more processors of the first network node, may cause the first network node to perform a wireless communication operation based at least in part on the plurality of estimated parameter values.

Some aspects described herein relate to a non-transitory computer-readable medium that stores a set of instructions for wireless communication by a first network node. The set of instructions, when executed by one or more processors of the first network node, may cause the first network node to transmit, to a second network node, a machine learning configuration associated with a multi-head machine learning model having a body module and a plurality of head modules, wherein the multi-head machine learning model is configured to determine a plurality of estimated parameter values of a plurality of parameters corresponding to a set of resources, wherein the body module is configured to extract a set of common features based at least in part on a set of model inputs corresponding to the set of resources, and wherein the plurality of head modules are configured to generate the plurality of estimated parameter values based at least in part on the set of common features. The set of instructions, when executed by one or more processors of the first network node, may cause the first network node to receive, from the second network node, an output report that indicates at least one of the plurality of estimated parameter values.

Some aspects described herein relate to an apparatus for wireless communication. The apparatus may include means for receiving a signal associated with a set of resources. The apparatus may include means for determining, using a multi-head machine learning model having a body module and a plurality of head modules, a plurality of estimated parameter values of a plurality of parameters corresponding to the set of resources, wherein the body module extracts a set of common features based at least in part on a set of model inputs corresponding to the set of resources, and wherein the plurality of head modules generate the plurality of estimated parameter values based at least in part on the set of common features. The apparatus may include means for performing a wireless communication operation based at least in part on the plurality of estimated parameter values.

Some aspects described herein relate to an apparatus for wireless communication. The apparatus may include means for transmitting, to a network node, a machine learning configuration associated with a multi-head machine learning model having a body module and a plurality of head modules, wherein the multi-head machine learning model is configured to determine a plurality of estimated parameter values of a plurality of parameters corresponding to a set of resources, wherein the body module is configured to extract a set of common features based at least in part on a set of model inputs corresponding to the set of resources, and wherein the plurality of head modules are configured to generate the plurality of estimated parameter values based at least in part on the set of common features. The apparatus may include means for receiving, from the network node, an output report that indicates at least one of the plurality of estimated parameter values.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
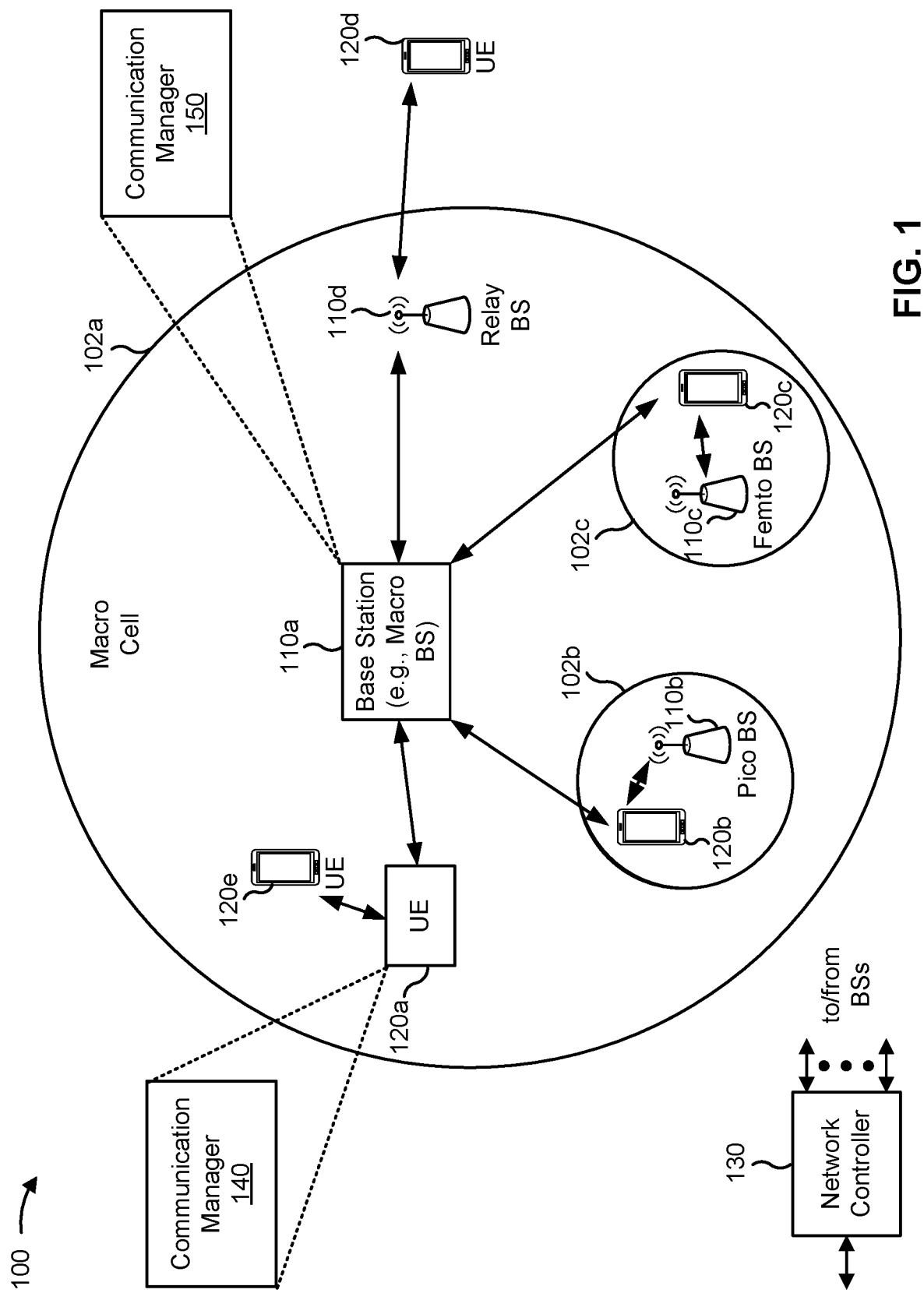
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a network node, which may be referred to as a "node," a "network node," or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, a first network node may include a communication manager 140 or a communication manager 150. As described in more detail elsewhere herein, the communication manager 140 or 150 may receive a signal associated with a set of resources; determine, using a multi-head machine learning model having a body module and a plurality of head modules, a plurality of estimated parameter values of a plurality of parameters corresponding to the set of resources, wherein the body module extracts a set of common features based at least in part on a set of model inputs corresponding to the set of resources, and wherein the plurality of head modules generate the plurality of estimated parameter values based at least in part on the set of common features; and perform a wireless communication operation based at least in part on the plurality of estimated parameter values.

As described in more detail elsewhere herein, the communication manager 140 or 150 may transmit, to a second network node, a machine learning configuration associated with a multi-head machine learning model having a body module and a plurality of head modules, wherein the multi-head machine learning model is configured to determine a plurality of estimated parameter values of a plurality of parameters corresponding to a set of resources, wherein the body module is configured to extract a set of common features based at least in part on a set of model inputs corresponding to the set of resources, and wherein the plurality of head modules are configured to generate the plurality of estimated parameter values based at least in part on the set of common features; and receive, from the second network node, an output report that indicates at least one of the plurality of estimated parameter values. Additionally, or alternatively, the communication manager 140 or 150 may perform one or more other operations described herein.

As indicated above, FIG. 1 is provided as an example. Other examples may differ from what is described with regard to FIG. 1.

Figure 2:
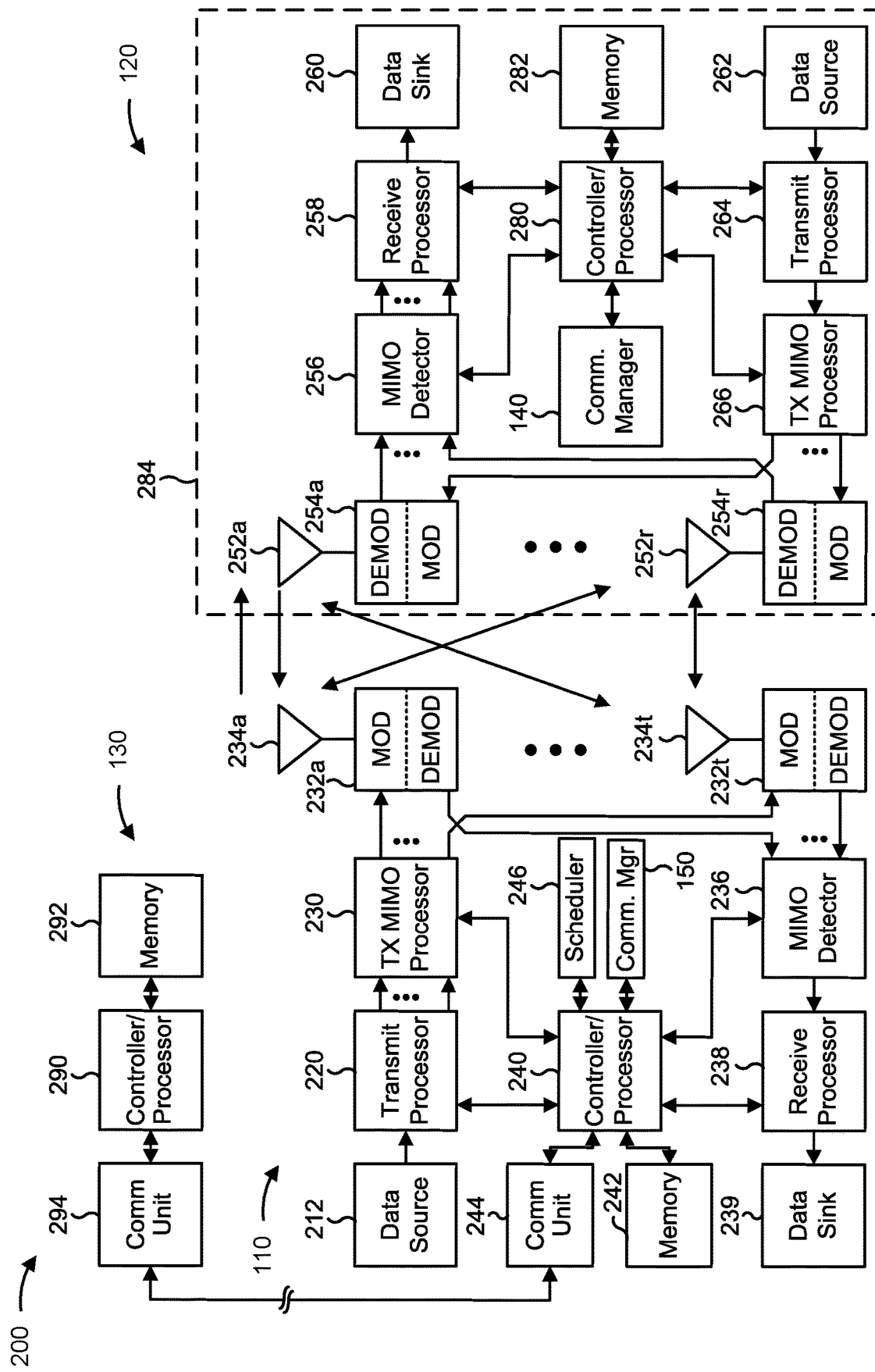
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

In some aspects, the term "base station" (e.g., the base station 110), "network node," or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (MC), or a Non-Real Time (Non-RT) MC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the base station 110, the controller/processor 280 of the UE 120, and/or any other component(s) of FIG. 2 may perform one or more techniques associated with a multi-head machine learning model for estimating a plurality of parameter values, as described in more detail elsewhere herein. In some aspects, the network node described herein is the base station 110, is included in the base station 110, or includes one or more components of the base station 110 shown in FIG. 2. In some aspects, the network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a first network node includes means for receiving a signal associated with a set of resources; means for determining, using a multi-head machine learning model having a body module and a plurality of head modules, a plurality of estimated parameter values of a plurality of parameters corresponding to the set of resources, wherein the body module extracts a set of common features based at least in part on a set of model inputs corresponding to the set of resources, and wherein the plurality of head modules generate the plurality of estimated parameter values based at least in part on the set of common features; and/or means for performing a wireless communication operation based at least in part on the plurality of estimated parameter values.

In some aspects, the first network node includes means for transmitting, to a second network node, a machine learning configuration associated with a multi-head machine learning model having a body module and a plurality of head modules, wherein the multi-head machine learning model is configured to determine a plurality of estimated parameter values of a plurality of parameters corresponding to a set of resources, wherein the body module is configured to extract a set of common features based at least in part on a set of model inputs corresponding to the set of resources, and wherein the plurality of head modules are configured to generate the plurality of estimated parameter values based at least in part on the set of common features; and/or means for receiving, from the second network node, an output report that indicates at least one of the plurality of estimated parameter values.

In some aspects, the means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
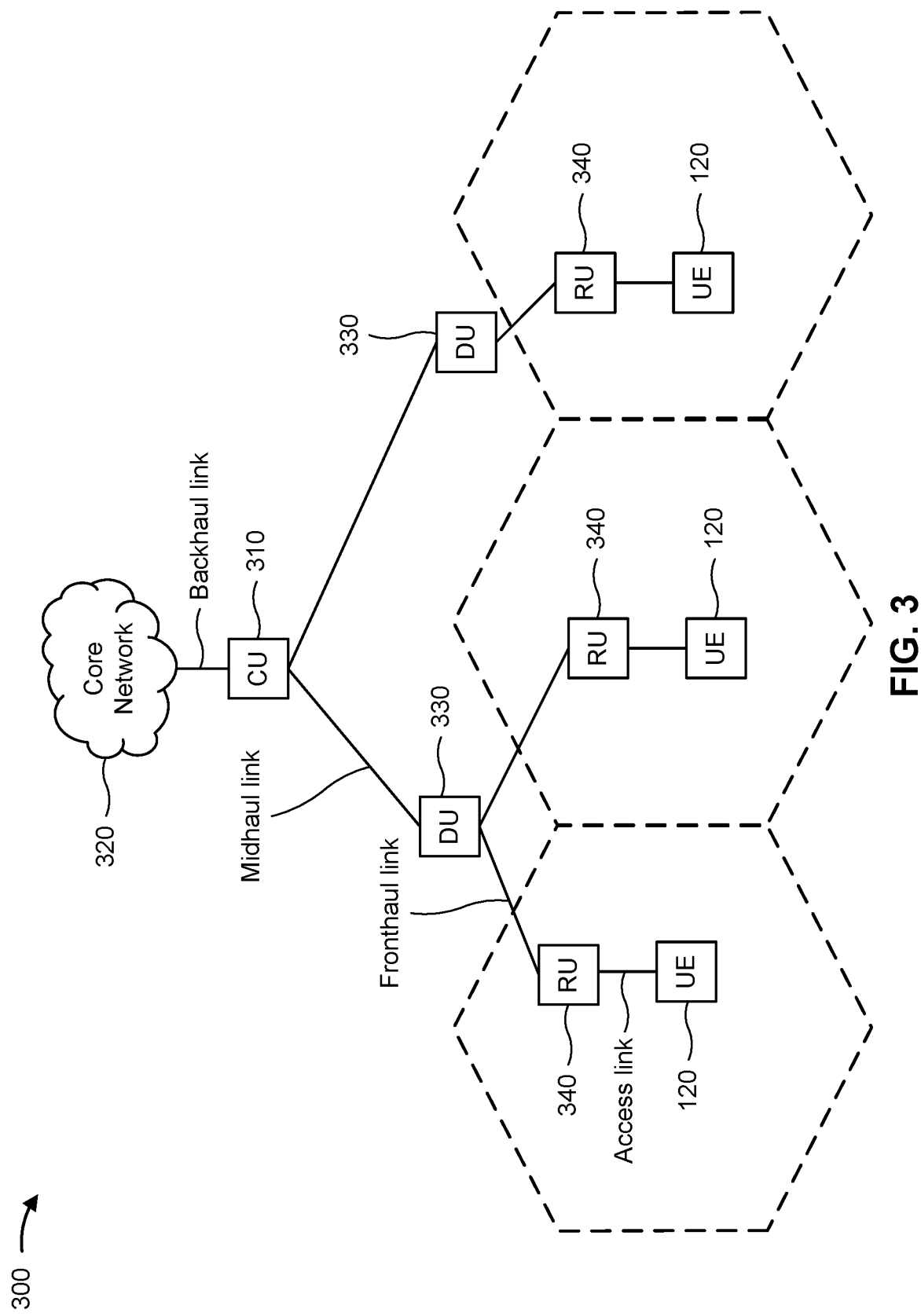
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a control unit (CU) 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

A first network node (e.g., a UE) operating in a wireless network can measure reference signals to report to a second network node (e.g., a base station). For example, the first network node can measure reference signals during a beam management process for channel state feedback (CSF), can measure received power of reference signals from a serving cell and/or neighbor cells, can measure signal strength of inter-radio access technology (e.g., WiFi) networks, and/or can measure sensor signals for detecting locations of one or more objects within an environment, among other examples.

Machine learning can be used to facilitate determining parameter values associated with measurements. The first network node can use a machine learning model to estimate a group of parameters (e.g., interference and/or channel state information (CSI), among other examples) from a common set of inputs (e.g., signal measurements) on current and/or future resources. For example, the first network node can jointly estimate the interference and the CSI on future resources using the same input CSI-reference signal (CSI-RS). In another example, the first network node can estimate the interference on multiple future slots and/or symbols using the same input measurements. However, machine learning models often have high complexity due to intensive matrix multiplications and pooling operations.

In some cases, to reduce complexity, the first network node can train multiple models, where each model estimates a single parameter on a specific resource. However, complexity is not necessarily reduced due to the cumulative effect of multiple machine learning models. Additionally, having multiple machine learning models can reduce flexibility. For example, a machine learning model trained to estimate wide-band interference would have to be re-trained to estimate a narrow-band interference. Moreover, since many of the estimated parameters can vary in the time domain, frequency domain, and spatial domain, the machine learning model would need to be run multiple times to estimate each variation of the parameter, resulting in high complexity. As a result, implementing multiple machine learning models and/or re-training a single machine learning model to determine multiple parameters can lead to unnecessary computational burdens, which can lead to decreased availability of processor resources and increased power consumption, thereby having a negative impact on network node performance.

Some aspects of the techniques and apparatuses described herein provide a multi-head machine learning model. The multi-head machine learning model may be a scalable design that allows an implementing network node to train a single machine learning model to estimate multiple parameters. In some aspects, the multi-head machine learning model may include a body module and a plurality of head modules. The body module may be configured to extract a set of common features from a set of inputs. The set of common features may be used by each of the multiple head modules to determine a respective estimated parameter value.

In some aspects, for example, each head module may determine an estimated value of a different parameter. In some aspects, each head module may determine an estimated parameter value of a same parameter corresponding to a respective resource of a plurality of resources. Aspects of the multi-head machine learning model may be used to determine estimated parameter values of various types using a single set of inputs. Estimated parameter values may be used for any number of different applications such as, for example, beam selection, interference modelling, CSI estimation, phase noise estimation, and localization, among other examples.

In some aspects, each head module may have a low degree of complexity since each head module learns from a high-level set of common features output from the body module. For example, in some aspects, a head module may be a single neuron, a single layer with multiple neurons, or multiple layers with one or more neurons in each layer. In this way, aspects of the subject matter disclosed herein may provide an efficient neural network design that learns common features using a single neural network body module instead of using separate neural networks for each application. As a result, some aspects may facilitate parameter value estimation with a reduction in complexity, processor burden, and power consumption, thereby having a positive impact on network node performance.

Figure 4:
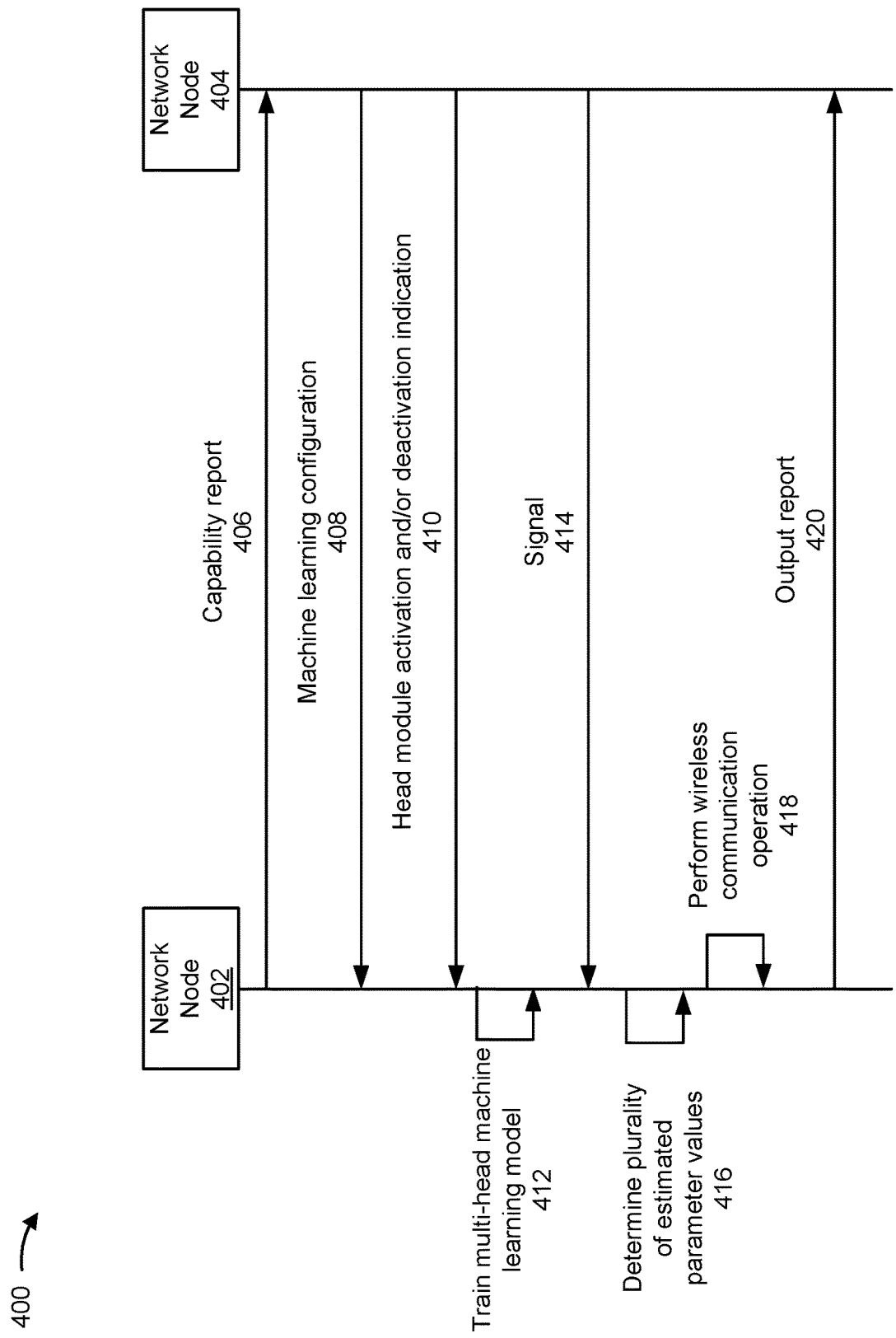
FIGS. 4-6 are diagrams illustrating examples associated with a multi-head machine learning model for estimating a plurality of parameter values, in accordance with the present disclosure.

FIG. 4 is a diagram illustrating an example 400 of a call flow associated with a multi-head machine learning model for estimating a plurality of parameter values, in accordance with the present disclosure. As shown, a network node 402 and a network node 404 may communicate with one another. In some aspects, the network node 402 may be referred to as a "first network node" and the network node 404 may be referred to as a "second network node." In some other aspects, the network node 404 may be referred to a "first network node" and the network node 402 may be referred to as a "second network node."

As shown by reference number 406, the network node 402 may transmit, and the network node 404 may receive, a capability report that indicates a capability associated with a multi-head machine learning model. In some aspects, for example, the capability report may indicate whether the network node 402 is configured to support a multi-head machine learning model and/or whether the network node 402 is configured with a multi-head machine learning model. For example, in some aspects, the capability report may indicate an implementation of the multi-head machine learning model and/or a maximum quantity of head modules associated with the multi-head machine learning model.

As shown by reference number 408, the network node 404 may transmit, and the network node 402 may receive, a machine learning configuration. In some aspects, the machine learning configuration may be based at least in part on the capability report. The machine learning configuration may be associated with a multi-head machine learning model (e.g., the multi-head machine learning model 500 depicted in FIG. 5). For example, in some aspects, the multi-head machine learning model may include a neural network. A head module of the plurality of head modules may include a single machine learning neuron, a single layer of multiple machine learning neurons, or a plurality of layers, each layer including at least one machine learning neuron.

In some aspects, the machine learning configuration may configure one or more head modules of a plurality of head modules, a quantity of head modules associated with the multi-head machine learning model, and/or one or more parameters corresponding to one or more head modules of the plurality of head modules, among other examples. In some aspects, the machine learning configuration may configure a training configuration associated with the multi-head machine learning module. For example, the machine learning configuration may configure one or more loss functions corresponding to one or more head modules, one or more weights associated with one or more loss functions, and/or a total loss function, among other examples.

As shown by reference number 410, the network node 404 may transmit, and the network node 402 may receiver, a head module activation indication associated with at least one head module and/or a head module deactivation indication associated with at least one head module. For example, in some aspects, the network node 404 may transmit an activation indication associated with a head module that is configured to generate an estimation of a certain metric that the network node 404 can use to facilitate a wireless communication task. Based at least in part on receiving the activation indication, the network node 402 may activate the corresponding head module. Similarly, if the network node 404 is not going to perform that task, and thus, does not have a use for that metric, the network node 404 may transmit a deactivation indication to the network node 402. Based at least in part on receiving the deactivation indication, the network node 402 may deactivate the corresponding head module. In this way, some aspects may facilitate customizing the multi-head machine learning module based on current wireless communication tasks, thereby reducing processing burdens when certain metrics are not desired.

As shown by reference number 412, the network node 402 may train the multi-head machine model. In some aspects, for example, the network node 402 may train the multi-head machine learning model based at least in part on a loss function, empirical data, and/or predetermined training data. In some aspects, for example, the network node 402 may train the multi-head machine learning model based at least in part on a total loss function, as described below in connection with FIG. 6. As shown by reference number 414, the network node 404 may transmit, and the network node 402 may receive, a signal associated with a set of resources. The set of resources may include, for example, a time domain resource, a frequency domain resource, an angular domain resource, and/or a spatial domain resource, among other examples. In some aspects, for example, the set of resources may include a symbol, a slot, a resource block, a bandwidth, a bandwidth part, a subchannel, and/or a beam, among other examples. The signal may include, for example, a reference signal.

As shown by reference number 416, the network node 402 may determine a plurality of estimated parameter values using the multi-head machine learning model. The plurality of estimated parameter values may be estimated values of a plurality of parameters corresponding to the set of resources associated with the signal. In some aspects, for example, as described below in connection with FIGS. 5 and 6, the multi-head machine learning model may be configured to extract a set of common features based at least in part on a set of model inputs corresponding to the set of resources. The plurality of head modules may be configured to generate the plurality of estimated parameter values based at least in part on the set of common features.

As shown by reference number 418, the network node 402 may perform a wireless communication operation based at least in part on the plurality of estimated parameter values. For example, in some aspects, the network node 402 may, based at least in part on the plurality of estimated parameter values, adjust a transmission parameter, adjust a reception parameter, and/or perform a beamforming operation, among other examples. In some aspects, as shown by reference number 420, the network node 402 may transmit an output report that indicates at least one of the plurality of estimated parameter values. The network node 404 may receive the output report and perform one or more wireless communication operations based at least in part on receiving the output report.

As indicated above, FIG. 4 is provided as an example. Other examples may differ from what is described with regard to FIG. 4. For example, in some aspects, the network node 404 may transmit additional signals to the network node 402.

Figure 5:
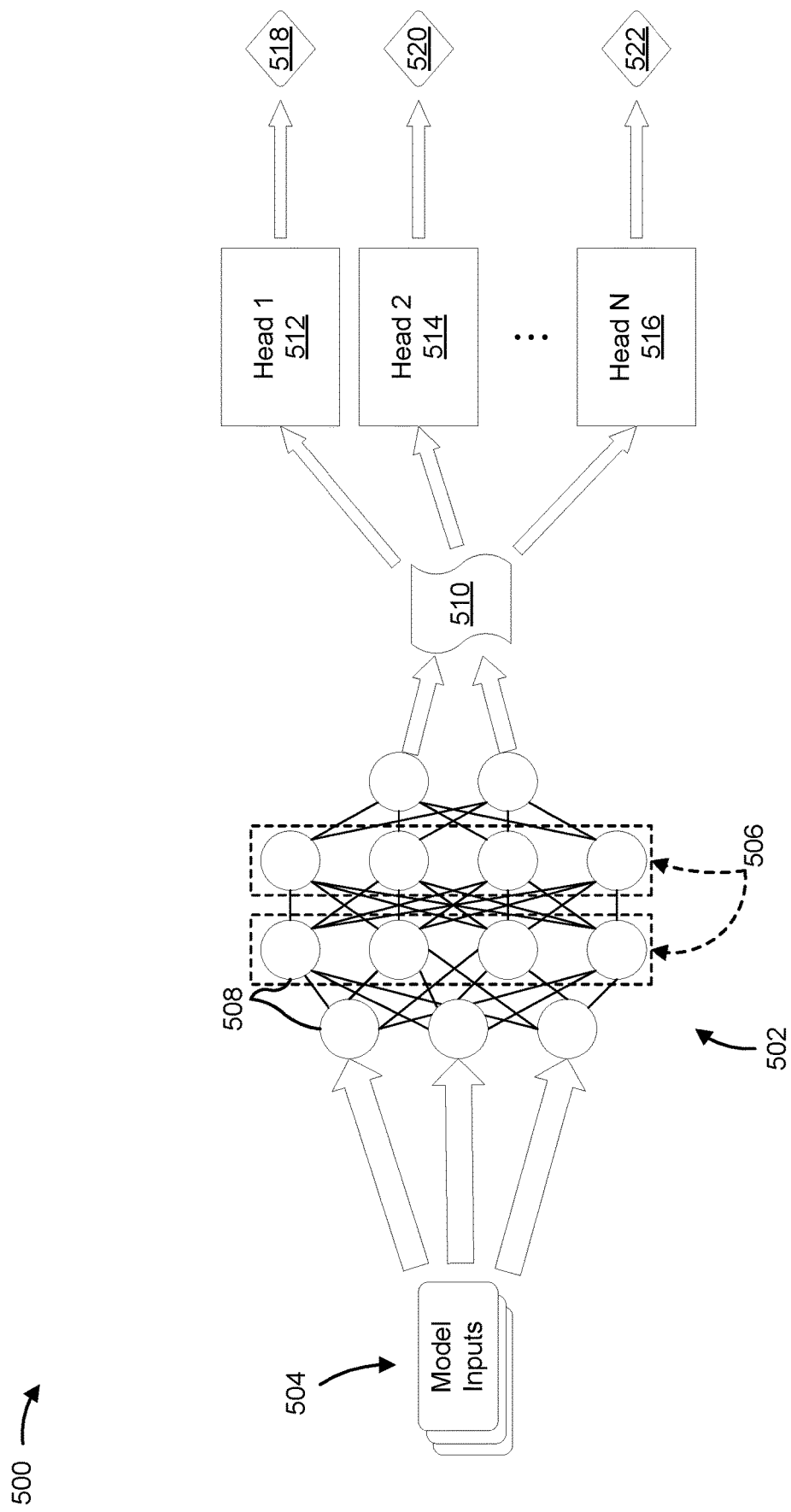

FIG. 5 is a diagram illustrating an example 500 of a multi-head machine learning model, in accordance with the present disclosure. In some aspects, for example, the multi-head machine learning model may be implemented on a network node (e.g., the network node 402, depicted in FIG. 4). The multi-head machine learning model may be implemented, for example, by a communication manager (e.g., the communication manager 908, depicted in FIG. 9). For example, the multi-head machine learning model may include one or more software components configured to be executed by one or more processors to perform one or more computation operations, as described herein.

In some aspects, the multi-head machine learning model may include a neural network. As shown, the multi-head machine learning model may include a body module 502 configured to receive a set 504 of model inputs. The body module 502 may include any number of layers 506, each layer having any number of neurons 508. The body module 502 may extract a set 510 of common features based at least in part on the set 504 of model inputs. In some aspects, for example, the multi-head machine learning model may be used to estimate an interference distribution on different sub-bands and/or slots.

The multi-head machine learning model may include a plurality of head modules 512, 514, and 516 (shown as "Head 1," "Head 2," . . . , "Head N"). The head modules 512, 514, and 516 each may receive the set 510 of common features extracted by the body module 502 and determine, based at least in part on the set 510 of common features, a plurality of estimated parameter values 518, 520, and 522, respectively. In some aspects, a head 512, 514, or 516 module may generate an estimated parameter value 518, 520, or 522, respectively, based at least in part on minimizing a loss function associated with the corresponding parameter.

In some aspects, the multi-head machine learning model may include only two head modules 512 and 514, three head modules 512, 514, and 516, or more than three head modules 512, 514, and 516. In some aspects, the number of head modules 512, 514, and 516 may be dynamically configurable, as described above in connection with FIG. 4. In some aspects, each head module 512, 514, and 516 may include a neural network and/or a portion of a neural network. For example, in some aspects, a head module 512, 514, or 516 may include a single neuron, a single layer including one or more neurons, or a plurality of layers, each of which includes one or more neurons. In some aspects, as shown in FIG. 5, each head module 512, 514, and 516 generates only one estimated parameter value 518, 520, or 522 of the plurality of estimated parameter values 518, 520, and 522.

Aspects of the multi-head machine learning model may be configured to determine any number of different types of estimated parameter values. For example, in some aspects, the set 504 of model inputs may be associated with a received signal (e.g., a reference signal). For example, in some aspects, the set 504 of model inputs may include measurements obtained based on the received signal such as, for example, measurements of amplitude, phase, wavelength, periodicity, signal-to-noise-plus-interference ratio (SINR), signal-to-noise ratio (SNR), reference signal received power (RSRP), and/or Doppler spread, among other examples. In some aspects, for example, the plurality of estimated parameter values 518, 520, and 522 may include a plurality of estimated interference distributions associated with a plurality of resources of a set of resources.

The set 504 of model inputs may correspond to a set of resources and the multi-head machine learning model may, in some aspects, perform calculations based on a per-resource granularity. For example, a head module 512, 514, and/or 516 of the multi-head machine learning model may determine an estimated parameter on a per-resource granularity basis (e.g., per slot, per sub-slot, per symbol, per resource block (RB), per subchannel, per channel, per beam, per bandwidth part, and/or per bandwidth, among other examples).

The plurality of estimated parameter values 518, 520, and 522 may include estimated values of a plurality of parameters corresponding to the set of resources associated with the signal. In some aspects, for example, the plurality of estimated parameter values 518, 520, and 522 may include at least one of an estimated parameter value associated with a current resource of the set of resources or a predicted parameter value associated with a future resource of the set of resources. In this way, for example, aspects of the multi-head machine learning model may be used to facilitate real-time wireless communication operations and/or to facilitate future wireless communication operations.

In some aspects, for example, the plurality of estimated parameter values 518, 520, and 522 may include a plurality of values associated with a set of estimated channel state information (CSI) parameter values. In some aspects, for example, the plurality of estimated parameter values 518, 520, and 522 may include at least one estimated CSI parameter value and at least one estimated interference parameter value. In some aspects, for example, the plurality of estimated parameter values 518, 520, and 522 may include a first estimated parameter value corresponding to a first parameter and a second estimated parameter value corresponding to a second parameter that is different than the first parameter, where the first estimated parameter value is based at least in part on the at least one reference signal, and where the second estimated parameter value is based at least in part on the at least one reference signal.

In some aspects, different head modules 512, 514, and 516 may determine different estimated values for a parameter associated with a reference signal. For example, the same set 504 of model inputs may be utilized to estimate a parameter value on different resources. In some aspects, the plurality of estimated parameter values 518, 520, and 522 may include a first estimated parameter value corresponding to a parameter in connection with a first resource and a second estimated parameter value corresponding to the parameter in connection with a second resource that is different than the first resource, where the first estimated parameter value is based at least in part on the at least one reference signal, and where the second estimated parameter value is based at least in part on the at least one reference signal. For example, different head modules 512, 514, and 516 may determine different estimated values for a parameter, where each head module 512, 514, and 516 determines an estimated value corresponding to a beam of a plurality of beams.

As indicated above, FIG. 5 is provided as an example. Other examples may differ from what is described with regard to FIG. 5. In various aspects, the multi-head machine learning model may be used to determine any number of different estimated parameter values corresponding to any number of different parameters. In some aspects, estimated parameter values output by different head modules may be used to derive other estimated parameter values. For example, a network node may use estimated parameter values determined using the multi-head machine learning model as inputs to a function to derive one or more additional estimated parameter values.

Figure 6:
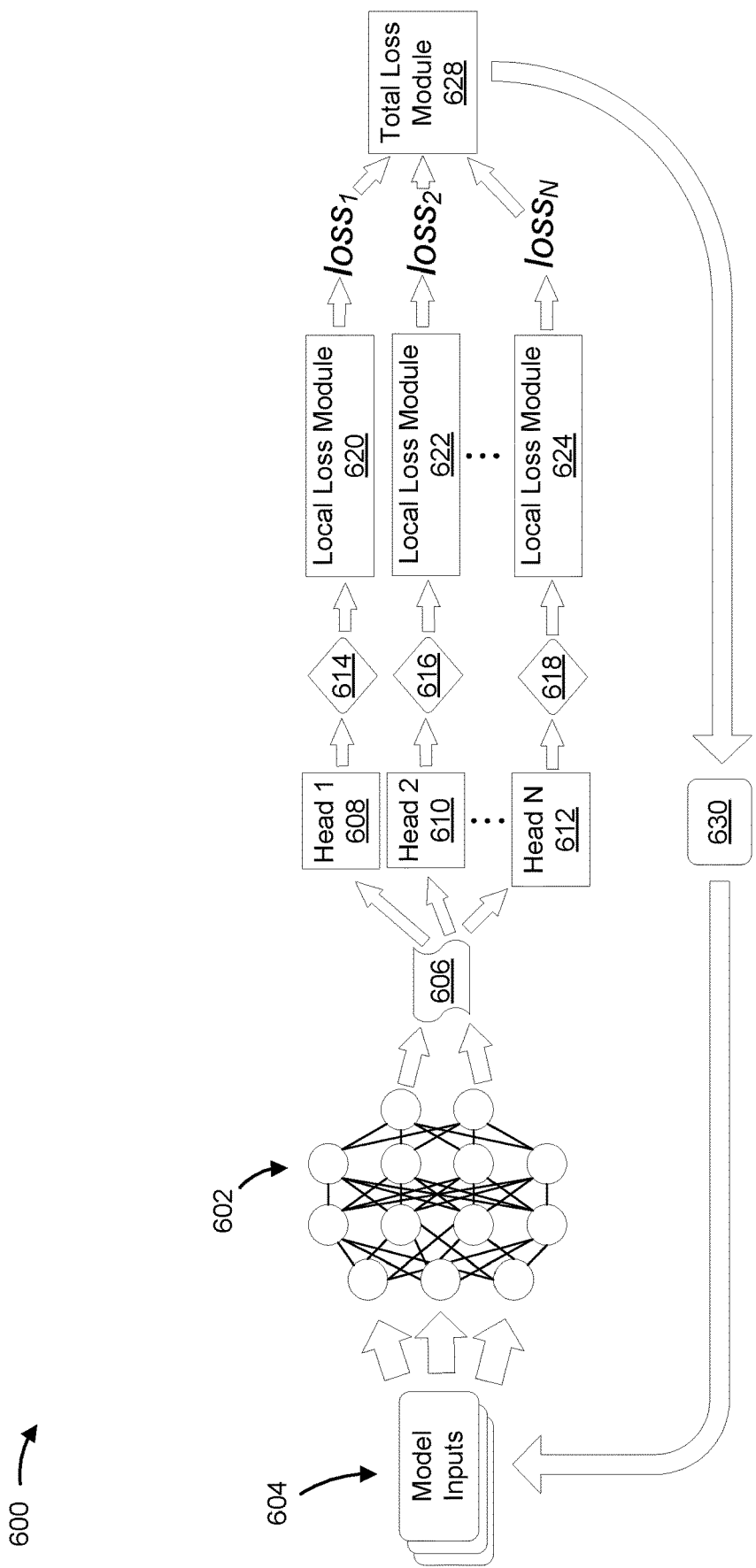

FIG. 6 is a diagram illustrating an example 600 of a multi-head machine learning model, in accordance with the present disclosure. In some aspects, for example, the multi-head machine learning model may be, be similar to, include, or be included in the multi-head machine learning model depicted in FIG. 5.

Example 600 shows an example of a training procedure that a network node may use to train a multi-head machine learning model. In some aspects, for example, the multi-head machine learning model may be trained using backpropagation. As shown, for example, a body module 602 may receive a set 604 of model inputs. The set 604 of model inputs may include training data that has been collected from previous estimations performed by the multi-head machine learning model and/or training data that has been obtained from a predetermined training set. The body module 602 may determine, based on the set 604 of model inputs, a set 606 of common features. For example, in some aspects, the body module 602 may extract the set 606 of common features based at least in part on a corresponding set of resources.

A plurality of head modules 608, 610, and 612 may receive, as input, the set 606 of common features and may determine a plurality of estimated parameter values 614, 616, and 618, respectively. Each of the plurality of estimated parameter values 614, 616, and 618 may be provided, as input, to a respective local loss module 620, 622, and 624. The local loss modules 620, 622, and 624 may each determine a local loss, $loss_i$, associated with the respective estimated parameter value 614, 616, or 618, where i is an index corresponding to a head module 608, 612, or 612.

The local loss values may be provided to a total loss module 628, which may be configured to determine a total loss 630 based at least in part on a total loss function. For example, in some aspects, the total loss function may include a weighted sum of the multiple loss functions associated with the head modules 608, 610, and 612. For example, the total loss module 628 may determine the total loss according to:

$$\text{Total loss} = \frac{\sum_{i=1}^{N} \alpha_i w_i \text{loss}_i}{\sum_{i=1}^{N} \alpha_i w_i},$$

where $\alpha_i=1$ if the ith head module is activated, $\alpha_i=0$ if the ith head module is not activated, and $w_i$ represents the weight of the ith head module's output on the total loss function. The total loss 630 may be back-propagated into the multi-head machine learning model as shown. In some aspects, the training procedure may be repeated until the local loss functions and/or the total loss function is minimized.

As indicated above, FIG. 6 is provided as an example. Other examples may differ from what is described with regard to FIG. 6. For example, in some aspects, any number of other types of training procedures may be used in lieu of, or in addition to, the back-propagation procedure described above.

Figure 7:
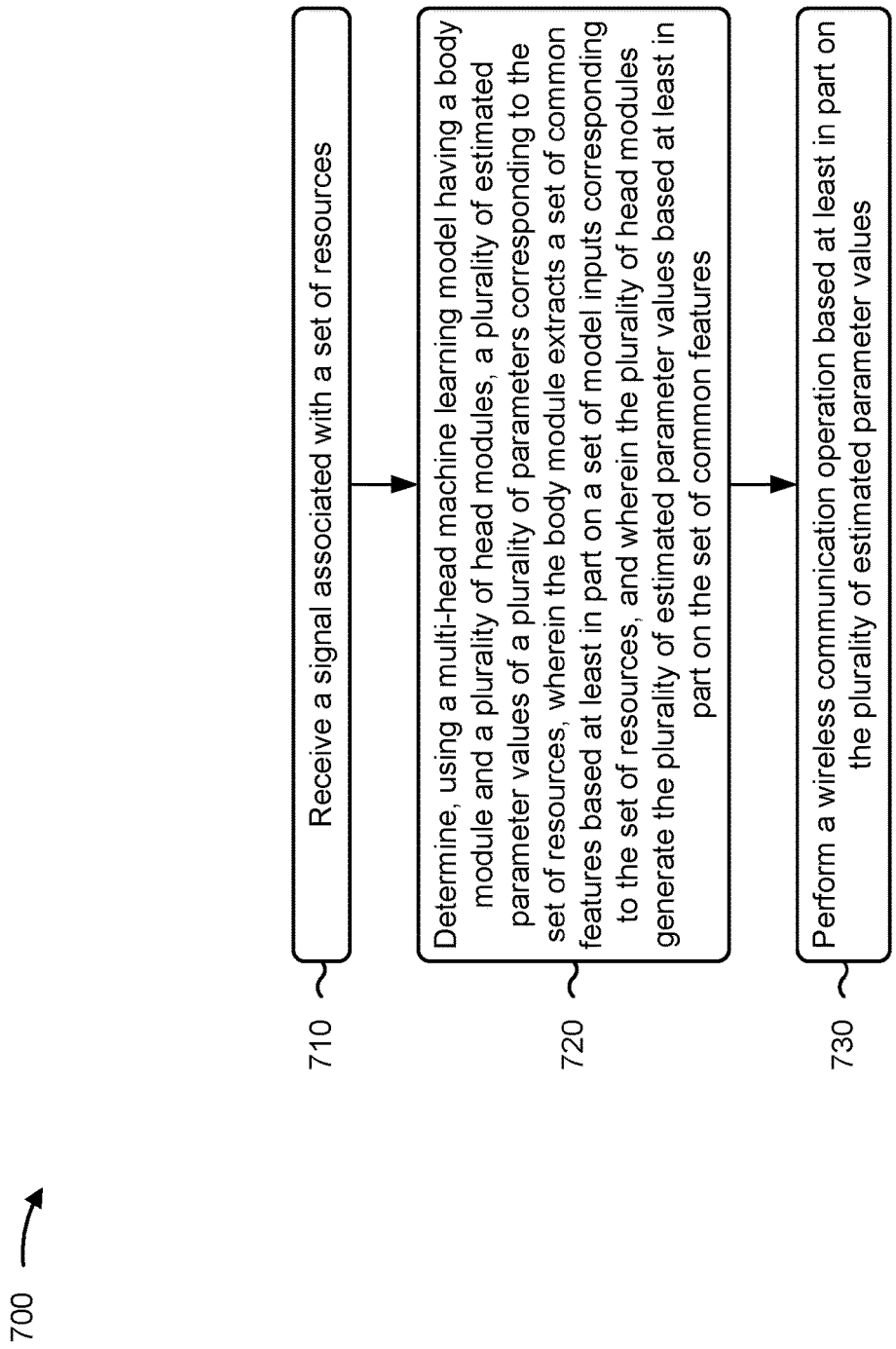
FIGS. 7 and 8 are diagrams illustrating example processes associated with a multi-head machine learning model for estimating a plurality of parameter values, in accordance with the present disclosure.

FIG. 7 is a diagram illustrating an example process 700 performed, for example, by a first network node, in accordance with the present disclosure. Example process 700 is an example where the first network node (e.g., the network node 402) performs operations associated with a multi-head machine learning model for estimating a plurality of parameter values.

As shown in FIG. 7, in some aspects, process 700 may include receiving a signal associated with a set of resources (block 710). For example, the first network node (e.g., using communication manager 908 and/or reception component 902, depicted in FIG. 9) may receive a signal associated with a set of resources, as described above.

As further shown in FIG. 7, in some aspects, process 700 may include determining, using a multi-head machine learning model having a body module and a plurality of head modules, a plurality of estimated parameter values of a plurality of parameters corresponding to the set of resources, wherein the body module extracts a set of common features based at least in part on a set of model inputs corresponding to the set of resources, and wherein the plurality of head modules generate the plurality of estimated parameter values based at least in part on the set of common features (block 720). For example, the first network node (e.g., using communication manager 908 and/or determination component 910, depicted in FIG. 9) may determine, using a multi-head machine learning model having a body module and a plurality of head modules, a plurality of estimated parameter values of a plurality of parameters corresponding to the set of resources, wherein the body module extracts a set of common features based at least in part on a set of model inputs corresponding to the set of resources, and wherein the plurality of head modules generate the plurality of estimated parameter values based at least in part on the set of common features, as described above.

As further shown in FIG. 7, in some aspects, process 700 may include performing a wireless communication operation based at least in part on the plurality of estimated parameter values (block 730). For example, the first network node (e.g., using communication manager 908, reception component 902, and/or transmission component 904, depicted in FIG. 9) may perform a wireless communication operation based at least in part on the plurality of estimated parameter values, as described above.

Process 700 may include additional aspects, such as any single aspect or any combination of aspects described below and/or in connection with one or more other processes described elsewhere herein.

In a first aspect, the set of resources comprises at least one of a time domain resource, a frequency domain resource, an angular domain resource, or a spatial domain resource. In a second aspect, alone or in combination with the first aspect, the set of resources comprises at least one of a symbol, a slot, a resource block, a bandwidth, a bandwidth part, a subchannel, or a beam.

In a third aspect, alone or in combination with one or more of the first and second aspects, each head module of the plurality of head modules generates only one estimated parameter value of the plurality of estimated parameter values. In a fourth aspect, alone or in combination with one or more of the first through third aspects, the plurality of estimated parameter values comprises at least one of an estimated parameter value associated with a current resource of the set of resources or a predicted parameter value associated with a future resource of the set of resources.

In a fifth aspect, alone or in combination with one or more of the first through fourth aspects, a head module of the plurality of head modules generates an estimated parameter value of the plurality of estimated parameter values based at least in part on minimizing a loss function associated with a parameter of the plurality of parameters. In a sixth aspect, alone or in combination with the fifth aspect, process 700 includes training the multi-head machine learning model based at least in part on a total loss function associated with the multi-head machine learning model. In a seventh aspect, alone or in combination with the sixth aspect, the total loss function comprises a weighted sum of the loss function and at least one additional loss function associated with at least one additional parameter of the plurality of parameters. In an eighth aspect, alone or in combination with one or more of the first through seventh aspects, process 700 includes receiving a machine learning configuration that configures a first weight associated with the loss function and a second weight associated with the at least one additional loss function. In a ninth aspect, alone or in combination with one or more of the seventh or eighth aspects, training the multi-head machine learning model comprises training the multi-head machine learning model based at least in part on back-propagation associated with the total loss function.

In a tenth aspect, alone or in combination with one or more of the first through ninth aspects, the multi-head machine learning model comprises a neural network. In an eleventh aspect, alone or in combination with the tenth aspect, a head module of the plurality of head modules comprises a single machine learning neuron. In a twelfth aspect, alone or in combination with the tenth aspect, a head module of the plurality of head modules comprises a single layer of multiple machine learning neurons. In a thirteenth aspect, alone or in combination with the tenth aspect, a head module of the plurality of head modules comprises a plurality of layers, each layer including at least one machine learning neuron.

In a fourteenth aspect, alone or in combination with one or more of the first through thirteenth aspects, the plurality of estimated parameter values comprises a plurality of estimated interference distributions associated with a plurality of resources of the set of resources. In a fifteenth aspect, alone or in combination with the fourteenth aspect, the set of model inputs comprises a set of configured channel state information reference signals corresponding to a set of prior resources of the set of resources. In a sixteenth aspect, alone or in combination with one or more of the fourteenth or fifteenth aspects, the set of common features comprises a set of interference features common to the plurality of resources.

In a seventeenth aspect, alone or in combination with one or more of the first through sixteenth aspects, the plurality of estimated parameter values comprises a plurality of values associated with a set of estimated channel state information parameter values. In an eighteenth aspect, alone or in combination with one or more of the first through seventeenth aspects, the plurality of estimated parameter values comprises at least one estimated channel state information parameter value and at least one estimated interference parameter value. In a nineteenth aspect, alone or in combination with one or more of the first through eighteenth aspects, the plurality of estimated parameter values comprises a plurality of predicted reference signal received power values corresponding to a plurality of beams.

In a twentieth aspect, alone or in combination with one or more of the first through nineteenth aspects, the set of model inputs are based at least in part on at least one reference signal. In a twenty-first aspect, alone or in combination with the twentieth aspect, the plurality of estimated parameter values comprises a first estimated parameter value corresponding to a first parameter and a second estimated parameter value corresponding to a second parameter that is different than the first parameter, wherein the first estimated parameter value is based at least in part on the at least one reference signal, and wherein the second estimated parameter value is based at least in part on the at least one reference signal. In a twenty-second aspect, alone or in combination with the twentieth aspect, the plurality of estimated parameter values comprises a first estimated parameter value corresponding to a parameter in connection with a first resource and a second estimated parameter value corresponding to the parameter in connection with a second resource that is different than the first resource, wherein the first estimated parameter value is based at least in part on the at least one reference signal, and wherein the second estimated parameter value is based at least in part on the at least one reference signal.

In a twenty-third aspect, alone or in combination with one or more of the first through twenty-second aspects, process 700 includes receiving a machine learning configuration that configures at least one of a head module of the plurality of head modules, a quantity of head modules associated with the multi-head machine learning model, or a parameter, of the plurality of parameters, corresponding to a head module of the plurality of head modules. In a twenty-fourth aspect, alone or in combination with one or more of the first through twenty-third aspects, process 700 includes receiving a machine learning configuration that configures a resource granularity associated with the set of resources at a head module of the plurality of head modules.

In a twenty-fifth aspect, alone or in combination with one or more of the first through twenty-fourth aspects, the multi-head machine learning model comprises at least one additional head module, process 700 includes receiving a head module deactivation indication associated with the at least one additional head module, and the plurality of head modules excludes the at least one additional head module. In a twenty-sixth aspect, alone or in combination with one or more of the first through twenty-fifth aspects, process 700 includes transmitting, to a second network node, a capability report that indicates a capability associated with the multi-head machine learning model, and receiving, from the second network node and based at least in part on the capability report, a machine learning configuration associated with the multi-head machine learning model. In a twenty-seventh aspect, alone or in combination with the twenty-sixth aspect, the capability report indicates at least one of implementation of the multi-head machine learning model, or a maximum quantity of head modules associated with the multi-head machine learning model. In a twenty-eighth aspect, alone or in combination with one or more of the first through twenty-seventh aspects, process 700 includes transmitting an output report that indicates at least one of the plurality of estimated parameter values.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
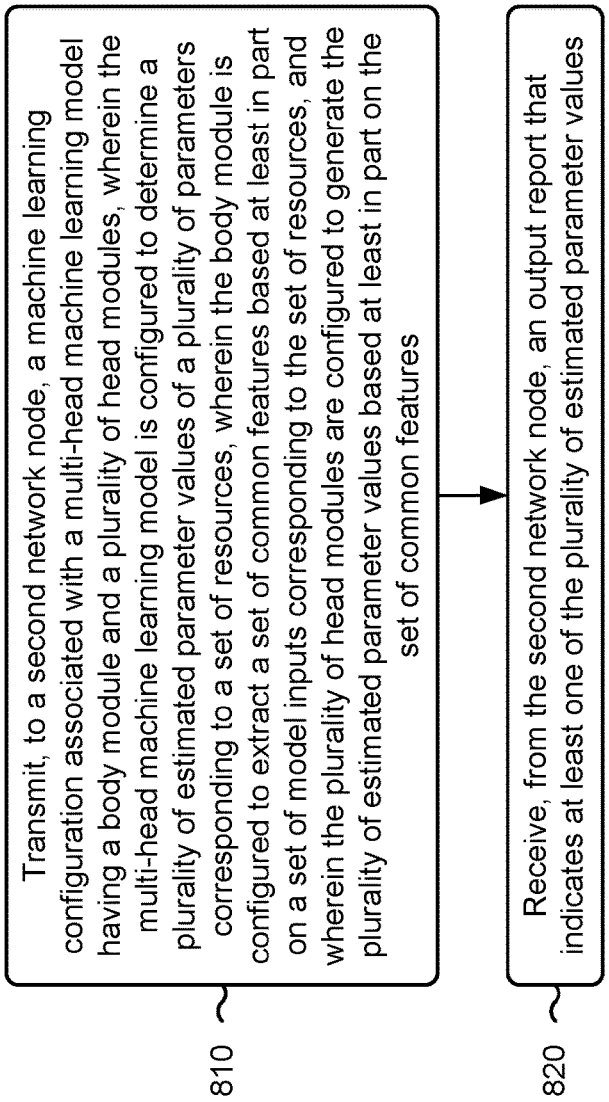

FIG. 8 is a diagram illustrating an example process 800 performed, for example, by a first network node, in accordance with the present disclosure. Example process 800 is an example where the first network node (e.g., the network node 404) performs operations associated with a multi-head machine learning model for estimating a plurality of parameter values.

As shown in FIG. 8, in some aspects, process 800 may include transmitting, to a second network node, a machine learning configuration associated with a multi-head machine learning model having a body module and a plurality of head modules, wherein the multi-head machine learning model is configured to determine a plurality of estimated parameter values of a plurality of parameters corresponding to a set of resources, wherein the body module is configured to extract a set of common features based at least in part on a set of model inputs corresponding to the set of resources, and wherein the plurality of head modules are configured to generate the plurality of estimated parameter values based at least in part on the set of common features (block 810). For example, the first network node (e.g., using communication manager 908 and/or transmission component 904, depicted in FIG. 9) may transmit, to a second network node, a machine learning configuration associated with a multi-head machine learning model having a body module and a plurality of head modules, wherein the multi-head machine learning model is configured to determine a plurality of estimated parameter values of a plurality of parameters corresponding to a set of resources, wherein the body module is configured to extract a set of common features based at least in part on a set of model inputs corresponding to the set of resources, and wherein the plurality of head modules are configured to generate the plurality of estimated parameter values based at least in part on the set of common features, as described above.

As further shown in FIG. 8, in some aspects, process 800 may include receiving, from the second network node, an output report that indicates at least one of the plurality of estimated parameter values (block 820). For example, the first network node (e.g., using communication manager 908 and/or reception component 902, depicted in FIG. 9) may receive, from the second network node, an output report that indicates at least one of the plurality of estimated parameter values, as described above.

Process 800 may include additional aspects, such as any single aspect or any combination of aspects described below and/or in connection with one or more other processes described elsewhere herein.

In a first aspect, the set of resources comprises at least one of a time domain resource, a frequency domain resource, an angular domain resource, or a spatial domain resource. In a second aspect, alone or in combination with the first aspect, the set of resources comprises at least one of a symbol, a slot, a resource block, a bandwidth, a bandwidth part, a subchannel, or a beam.

In a third aspect, alone or in combination with one or more of the first and second aspects, each head module of the plurality of head modules is configured to generate only one estimated parameter value of the plurality of estimated parameter values. In a fourth aspect, alone or in combination with one or more of the first through third aspects, the plurality of estimated parameter values comprises at least one of an estimated parameter value associated with a current resource of the set of resources or a predicted parameter value associated with a future resource of the set of resources.

In a fifth aspect, alone or in combination with one or more of the first through fourth aspects, a head module of the plurality of head modules is configured to generate an estimated parameter value of the plurality of estimated parameter values based at least in part on minimizing a loss function associated with a parameter of the plurality of parameters. In a sixth aspect, alone or in combination with the fifth aspect, the multi-head machine learning model is configured to be trained based at least in part on a total loss function associated with the multi-head machine learning model. In a seventh aspect, alone or in combination with the sixth aspect, the total loss function comprises a weighted sum of the loss function and at least one additional loss function associated with at least one additional parameter of the plurality of parameters. In an eighth aspect, alone or in combination with the seventh aspect, the machine learning configuration configures a first weight associated with the loss function and a second weight associated with the at least one additional loss function. In a ninth aspect, alone or in combination with one or more of the seventh through eighth aspects, the multi-head machine learning model is configured to be trained based at least in part on back-propagation associated with the total loss function.

In a tenth aspect, alone or in combination with one or more of the first through ninth aspects, the multi-head machine learning model comprises a neural network. In an eleventh aspect, alone or in combination with the tenth aspect, a head module of the plurality of head modules comprises a single machine learning neuron. In a twelfth aspect, alone or in combination with the tenth aspect, a head module of the plurality of head modules comprises a single layer of multiple machine learning neurons. In a thirteenth aspect, alone or in combination with the tenth aspect, a head module of the plurality of head modules comprises a plurality of layers, each layer including at least one machine learning neuron.

In a fourteenth aspect, alone or in combination with one or more of the first through thirteenth aspects, the plurality of estimated parameter values comprises a plurality of estimated interference distributions associated with a plurality of resources of the set of resources. In a fifteenth aspect, alone or in combination with the fourteenth aspect, the set of model inputs comprises a set of configured channel state information reference signals corresponding to a set of prior resources of the set of resources. In a sixteenth aspect, alone or in combination with one or more of the fourteenth through fifteenth aspects, the set of common features comprises a set of interference features common to the plurality of resources.

In a seventeenth aspect, alone or in combination with one or more of the first through sixteenth aspects, the plurality of estimated parameter values comprises a plurality of values associated with a set of estimated channel state information parameter values. In an eighteenth aspect, alone or in combination with one or more of the first through seventeenth aspects, the plurality of estimated parameter values comprises at least one estimated channel state information parameter value and at least one estimated interference parameter value. In a nineteenth aspect, alone or in combination with one or more of the first through eighteenth aspects, the plurality of estimated parameter values comprises a plurality of predicted reference signal received power values corresponding to a plurality of beams. In a twentieth aspect, alone or in combination with one or more of the first through nineteenth aspects, the set of model inputs are based at least in part on at least one reference signal. In a twenty-first aspect, alone or in combination with the twentieth aspect, the plurality of estimated parameter values comprises a first estimated parameter value corresponding to a first parameter and a second estimated parameter value corresponding to a second parameter that is different than the first parameter, wherein the first estimated parameter value is based at least in part on at least one reference signal, and wherein the second estimated parameter value is based at least in part on the at least one reference signal. In a twenty-second aspect, alone or in combination with the twentieth aspect, the plurality of estimated parameter values comprises a first estimated parameter value corresponding to a parameter in connection with a first resource and a second estimated parameter value corresponding to the parameter in connection with a second resource that is different than the first resource, wherein the first estimated parameter value is based at least in part on at least one reference signal, and wherein the second estimated parameter value is based at least in part on the at least one reference signal.

In a twenty-third aspect, alone or in combination with one or more of the first through twenty-second aspects, the machine learning configuration further configures at least one of a head module of the plurality of head modules, a quantity of head modules associated with the multi-head machine learning model, or a parameter, of the plurality of parameters, corresponding to a head module of the plurality of head modules. In a twenty-fourth aspect, alone or in combination with one or more of the first through twenty-third aspects, the machine learning configuration configures a resource granularity associated with the set of resources at a head module of the plurality of head modules. In a twenty-fifth aspect, alone or in combination with one or more of the first through twenty-fourth aspects, the multi-head machine learning model comprises at least one additional head module, process 800 includes transmitting a head module deactivation indication associated with the at least one additional head module, and the plurality of head modules excludes the at least one additional head module.

In a twenty-sixth aspect, alone or in combination with one or more of the first through twenty-fifth aspects, process 800 includes receiving, from a second network node, a capability report that indicates a capability associated with the multi-head machine learning model, wherein transmitting the machine learning configuration comprises transmitting the machine learning configuration based at least in part on the capability report. In a twenty-seventh aspect, alone or in combination with the twenty-sixth aspect, the capability report indicates at least one of implementation of the multi-head machine learning model, or a maximum quantity of head modules associated with the multi-head machine learning model.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
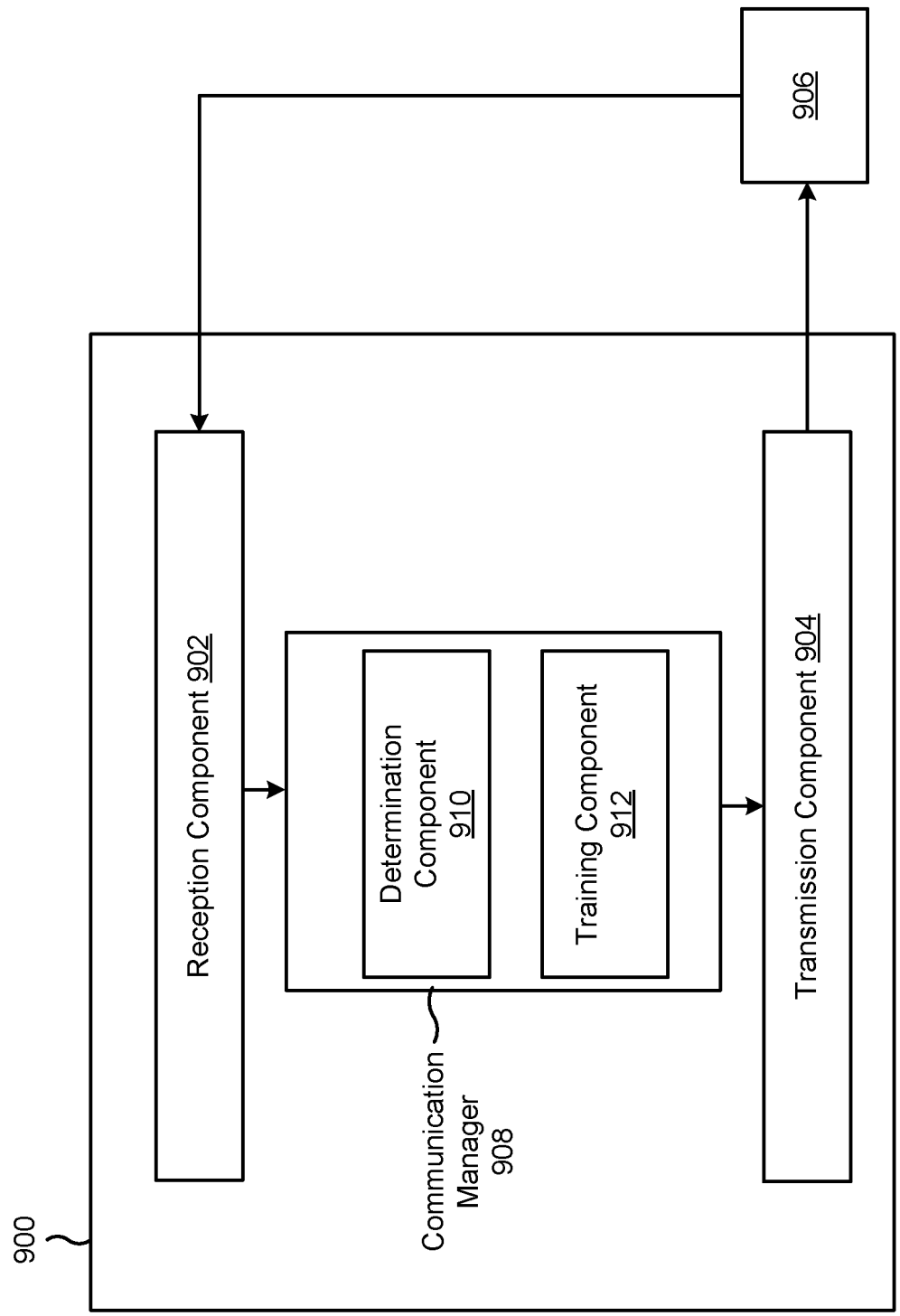
FIG. 9 is a diagram of an example apparatus for wireless communication, in accordance with the present disclosure.

FIG. 9 is a diagram of an example apparatus 900 for wireless communication. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908. The communication manager 908 may include one or more of a determination component 910, or a training component 912, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE or the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE or the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE or the base station described in connection with FIG. 2. In some aspects, the transmission component 904 may be co-located with the reception component 902 in a transceiver.

The reception component 902 may receive a signal associated with a set of resources. The communication manager 908 and/or the determination component 910 may determine, using a multi-head machine learning model having a body module and a plurality of head modules, a plurality of estimated parameter values of a plurality of parameters corresponding to the set of resources, wherein the body module extracts a set of common features based at least in part on a set of model inputs corresponding to the set of resources, and wherein the plurality of head modules generate the plurality of estimated parameter values based at least in part on the set of common features. The communication manager 908, the reception component 902, and/or the transmission component 904 may perform a wireless communication operation based at least in part on the plurality of estimated parameter values.

In some aspects, the communication manager 908 may include one or more antennas, a modem, a controller/processor, a memory, or a combination thereof, of the UE or the base station described in connection with FIG. 2. In some aspects, the communication manager 908 may be, be similar to, include, or be included in, the communication manager 140 and/or the communication manager 150, depicted in FIGS. 1 and 2. In some aspects, the communication manager 908 may include the reception component 902 and/or the transmission component 904. In some aspects, the determination component 910 may include one or more antennas, a modem, a controller/processor, a memory, or a combination thereof, of the UE or the base station described in connection with FIG. 2. In some aspects, the determination component 910 may include the reception component 902 and/or the transmission component 904.

The training component 912 may train the multi-head machine learning model based at least in part on a total loss function associated with the multi-head machine learning model. In some aspects, the training component 912 may include one or more antennas, a modem, a controller/processor, a memory, or a combination thereof, of the UE or the base station described in connection with FIG. 2. In some aspects, the training component 912 may include the reception component 902 and/or the transmission component 904.

The reception component 902 may receive a machine learning configuration that configures a first weight associated with the loss function and a second weight associated with the at least one additional loss function. The reception component 902 may receive a machine learning configuration that configures at least one of a head module of the plurality of head modules, a quantity of head modules associated with the multi-head machine learning model, or a parameter, of the plurality of parameters, corresponding to a head module of the plurality of head modules.

The reception component 902 may receive a machine learning configuration that configures a resource granularity associated with the set of resources at a head module of the plurality of head modules. The transmission component 904 may transmit, to a second network node, a capability report that indicates a capability associated with the multi-head machine learning model. The reception component 902 may receive, from the second network node and based at least in part on the capability report, a machine learning configuration associated with the multi-head machine learning model. The transmission component 904 may transmit an output report that indicates at least one of the plurality of estimated parameter values.

The transmission component 904 may transmit, to a second network node, a machine learning configuration associated with a multi-head machine learning model having a body module and a plurality of head modules, wherein the multi-head machine learning model is configured to determine a plurality of estimated parameter values of a plurality of parameters corresponding to a set of resources, wherein the body module is configured to extract a set of common features based at least in part on a set of model inputs corresponding to the set of resources, and wherein the plurality of head modules are configured to generate the plurality of estimated parameter values based at least in part on the set of common features. The reception component 902 may receive, from the second network node, an output report that indicates at least one of the plurality of estimated parameter values. The reception component 902 may receive, from a second network node, a capability report that indicates a capability associated with the multi-head machine learning model, wherein transmitting the machine learning configuration comprises transmitting the machine learning configuration based at least in part on the capability report.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first network node, comprising: receiving a signal associated with a set of resources; determining, using a multi-head machine learning model having a body module and a plurality of head modules, a plurality of estimated parameter values of a plurality of parameters corresponding to the set of resources, wherein the body module extracts a set of common features based at least in part on a set of model inputs corresponding to the set of resources, and wherein the plurality of head modules generate the plurality of estimated parameter values based at least in part on the set of common features; and performing a wireless communication operation based at least in part on the plurality of estimated parameter values.

Aspect 2: The method of Aspect 1, wherein the set of resources comprises at least one of a time domain resource, a frequency domain resource, an angular domain resource, or a spatial domain resource.

Aspect 3: The method of either of Aspects 1 or 2, wherein the set of resources comprises at least one of a symbol, a slot, a resource block, a bandwidth, a bandwidth part, a subchannel, or a beam.

Aspect 4: The method of any of Aspects 1-3, wherein each head module of the plurality of head modules generates only one estimated parameter value of the plurality of estimated parameter values.

Aspect 5: The method of any of Aspects 1-4, wherein the plurality of estimated parameter values comprises at least one of an estimated parameter value associated with a current resource of the set of resources or a predicted parameter value associated with a future resource of the set of resources.

Aspect 6: The method of any of Aspects 1-5, wherein a head module of the plurality of head modules generates an estimated parameter value of the plurality of estimated parameter values based at least in part on minimizing a loss function associated with a parameter of the plurality of parameters.

Aspect 7: The method of Aspect 6, further comprising training the multi-head machine learning model based at least in part on a total loss function associated with the multi-head machine learning model.

Aspect 8: The method of Aspect 7, wherein the total loss function comprises a weighted sum of the loss function and at least one additional loss function associated with at least one additional parameter of the plurality of parameters.

Aspect 9: The method of Aspect 8, further comprising receiving a machine learning configuration that configures a first weight associated with the loss function and a second weight associated with the at least one additional loss function.

Aspect 10: The method of either of Aspects 8 or 9, wherein training the multi-head machine learning model comprises training the multi-head machine learning model based at least in part on back-propagation associated with the total loss function.

Aspect 11: The method of any of Aspects 1-10, wherein the multi-head machine learning model comprises a neural network.

Aspect 12: The method of Aspect 11, wherein a head module of the plurality of head modules comprises a single machine learning neuron.

Aspect 13: The method of Aspect 11, wherein a head module of the plurality of head modules comprises a single layer of multiple machine learning neurons.

Aspect 14: The method of Aspect 11, wherein a head module of the plurality of head modules comprises a plurality of layers, each layer including at least one machine learning neuron.

Aspect 15: The method of any of Aspects 1-14, wherein the plurality of estimated parameter values comprises a plurality of estimated interference distributions associated with a plurality of resources of the set of resources.

Aspect 16: The method of Aspect 15, wherein the set of model inputs comprises a set of configured channel state information reference signals corresponding to a set of prior resources of the set of resources.

Aspect 17: The method of either of Aspects 15 or 16, wherein the set of common features comprises a set of interference features common to the plurality of resources.

Aspect 18: The method of any of Aspects 1-17, wherein the plurality of estimated parameter values comprises a plurality of values associated with a set of estimated channel state information parameter values.

Aspect 19: The method of any of Aspects 1-18, wherein the plurality of estimated parameter values comprises at least one estimated channel state information parameter value and at least one estimated interference parameter value.

Aspect 20: The method of any of Aspects 1-19, wherein the plurality of estimated parameter values comprises a plurality of predicted reference signal received power values corresponding to a plurality of beams.

Aspect 21: The method of any of Aspects 1-20, wherein the set of model inputs are based at least in part on at least one reference signal.

Aspect 22: The method of Aspect 21, wherein the plurality of estimated parameter values comprises a first estimated parameter value corresponding to a first parameter and a second estimated parameter value corresponding to a second parameter that is different than the first parameter, wherein the first estimated parameter value is based at least in part on the at least one reference signal, and wherein the second estimated parameter value is based at least in part on the at least one reference signal.

Aspect 23: The method of Aspect 21, wherein the plurality of estimated parameter values comprises a first estimated parameter value corresponding to a parameter in connection with a first resource and a second estimated parameter value corresponding to the parameter in connection with a second resource that is different than the first resource, wherein the first estimated parameter value is based at least in part on the at least one reference signal, and wherein the second estimated parameter value is based at least in part on the at least one reference signal.

Aspect 24: The method of any of Aspects 1-23, further comprising receiving a machine learning configuration that configures at least one of: a head module of the plurality of head modules, a quantity of head modules associated with the multi-head machine learning model, or a parameter, of the plurality of parameters, corresponding to a head module of the plurality of head modules.

Aspect 25: The method of any of Aspects 1-24, further comprising receiving a machine learning configuration that configures a resource granularity associated with the set of resources at a head module of the plurality of head modules.

Aspect 26: The method of any of Aspects 1-25, wherein the multi-head machine learning model comprises at least one additional head module, the method further comprising receiving a head module deactivation indication associated with the at least one additional head module, and wherein the plurality of head modules excludes the at least one additional head module.

Aspect 27: The method of any of Aspects 1-26, further comprising: transmitting, to a second network node, a capability report that indicates a capability associated with the multi-head machine learning model; and receiving, from the second network node and based at least in part on the capability report, a machine learning configuration associated with the multi-head machine learning model.

Aspect 28: The method of Aspect 27, wherein the capability report indicates at least one of: implementation of the multi-head machine learning model, or a maximum quantity of head modules associated with the multi-head machine learning model.

Aspect 29: The method of any of Aspects 1-28, further comprising transmitting an output report that indicates at least one of the plurality of estimated parameter values.

Aspect 30: A method of wireless communication performed by a first network node, comprising: transmitting, to a second network node, a machine learning configuration associated with a multi-head machine learning model having a body module and a plurality of head modules, wherein the multi-head machine learning model is configured to determine a plurality of estimated parameter values of a plurality of parameters corresponding to a set of resources, wherein the body module is configured to extract a set of common features based at least in part on a set of model inputs corresponding to the set of resources, and wherein the plurality of head modules are configured to generate the plurality of estimated parameter values based at least in part on the set of common features; and receiving, from the second network node, an output report that indicates at least one of the plurality of estimated parameter values.

Aspect 31: The method of Aspect 30, wherein the set of resources comprises at least one of a time domain resource, a frequency domain resource, an angular domain resource, or a spatial domain resource.

Aspect 32: The method of either of Aspects 30 or 31, wherein the set of resources comprises at least one of a symbol, a slot, a resource block, a bandwidth, a bandwidth part, a subchannel, or a beam.

Aspect 33: The method of any of Aspects 30-32, wherein each head module of the plurality of head modules is configured to generate only one estimated parameter value of the plurality of estimated parameter values.

Aspect 34: The method of any of Aspects 30-33, wherein the plurality of estimated parameter values comprises at least one of an estimated parameter value associated with a current resource of the set of resources or a predicted parameter value associated with a future resource of the set of resources.

Aspect 35: The method of any of Aspects 30-34, wherein a head module of the plurality of head modules is configured to generate an estimated parameter value of the plurality of estimated parameter values based at least in part on minimizing a loss function associated with a parameter of the plurality of parameters.

Aspect 36: The method of Aspect 35, wherein the multi-head machine learning model is configured to be trained based at least in part on a total loss function associated with the multi-head machine learning model.

Aspect 37: The method of Aspect 36, wherein the total loss function comprises a weighted sum of the loss function and at least one additional loss function associated with at least one additional parameter of the plurality of parameters.

Aspect 38: The method of Aspect 37, wherein the machine learning configuration configures a first weight associated with the loss function and a second weight associated with the at least one additional loss function.

Aspect 39: The method of either of Aspects 37 or 38, wherein the multi-head machine learning model is configured to be trained based at least in part on back-propagation associated with the total loss function.

Aspect 40: The method of any of Aspects 30-39, wherein the multi-head machine learning model comprises a neural network.

Aspect 41: The method of Aspect 40, wherein a head module of the plurality of head modules comprises a single machine learning neuron.

Aspect 42: The method of Aspect 40, wherein a head module of the plurality of head modules comprises a single layer of multiple machine learning neurons.

Aspect 43: The method of Aspect 40, wherein a head module of the plurality of head modules comprises a plurality of layers, each layer including at least one machine learning neuron.

Aspect 44: The method of any of Aspects 30-43, wherein the plurality of estimated parameter values comprises a plurality of estimated interference distributions associated with a plurality of resources of the set of resources.

Aspect 45: The method of Aspect 44, wherein the set of model inputs comprises a set of configured channel state information reference signals corresponding to a set of prior resources of the set of resources.

Aspect 46: The method of either of Aspects 44 or 45, wherein the set of common features comprises a set of interference features common to the plurality of resources.

Aspect 47: The method of any of Aspects 30-46, wherein the plurality of estimated parameter values comprises a plurality of values associated with a set of estimated channel state information parameter values.

Aspect 48: The method of any of Aspects 30-47, wherein the plurality of estimated parameter values comprises at least one estimated channel state information parameter value and at least one estimated interference parameter value.

Aspect 49: The method of any of Aspects 30-48, wherein the plurality of estimated parameter values comprises a plurality of predicted reference signal received power values corresponding to a plurality of beams.

Aspect 50: The method of any of Aspects 30-49, wherein the set of model inputs are based at least in part on at least one reference signal.

Aspect 51: The method of Aspect 50, wherein the plurality of estimated parameter values comprises a first estimated parameter value corresponding to a first parameter and a second estimated parameter value corresponding to a second parameter that is different than the first parameter, wherein the first estimated parameter value is based at least in part on at least one reference signal, and wherein the second estimated parameter value is based at least in part on the at least one reference signal.

Aspect 52: The method of Aspect 50, wherein the plurality of estimated parameter values comprises a first estimated parameter value corresponding to a parameter in connection with a first resource and a second estimated parameter value corresponding to the parameter in connection with a second resource that is different than the first resource, wherein the first estimated parameter value is based at least in part on at least one reference signal, and wherein the second estimated parameter value is based at least in part on the at least one reference signal.

Aspect 53: The method of any of Aspects 30-52, wherein the machine learning configuration further configures at least one of: a head module of the plurality of head modules, a quantity of head modules associated with the multi-head machine learning model, or a parameter, of the plurality of parameters, corresponding to a head module of the plurality of head modules.

Aspect 54: The method of any of Aspects 30-53, wherein the machine learning configuration configures a resource granularity associated with the set of resources at a head module of the plurality of head modules.

Aspect 55: The method of any of Aspects 30-54, wherein the multi-head machine learning model comprises at least one additional head module, the method further comprising transmitting a head module deactivation indication associated with the at least one additional head module, and wherein the plurality of head modules excludes the at least one additional head module.

Aspect 56: The method of any of Aspects 30-55, further comprising receiving, from a second network node, a capability report that indicates a capability associated with the multi-head machine learning model, wherein transmitting the machine learning configuration comprises transmitting the machine learning configuration based at least in part on the capability report.

Aspect 57: The method of Aspect 56, wherein the capability report indicates at least one of: implementation of the multi-head machine learning model, or a maximum quantity of head modules associated with the multi-head machine learning model.

Aspect 58: An apparatus for wireless communication at a device, comprising a processor; memory coupled with the processor; and instructions stored in the memory and executable by the processor to cause the apparatus to perform the method of one or more of Aspects 1-29.

Aspect 59: A device for wireless communication, comprising a memory and one or more processors coupled to the memory, the one or more processors configured to perform the method of one or more of Aspects 1-29.

Aspect 60: An apparatus for wireless communication, comprising at least one means for performing the method of one or more of Aspects 1-29.

Aspect 61: A non-transitory computer-readable medium storing code for wireless communication, the code comprising instructions executable by a processor to perform the method of one or more of Aspects 1-29.

Aspect 62: A non-transitory computer-readable medium storing a set of instructions for wireless communication, the set of instructions comprising one or more instructions that, when executed by one or more processors of a device, cause the device to perform the method of one or more of Aspects 1-29.

Aspect 63: An apparatus for wireless communication at a device, comprising a processor; memory coupled with the processor; and instructions stored in the memory and executable by the processor to cause the apparatus to perform the method of one or more of Aspects 30-57.

Aspect 64: A device for wireless communication, comprising a memory and one or more processors coupled to the memory, the one or more processors configured to perform the method of one or more of Aspects 30-57.

Aspect 65: An apparatus for wireless communication, comprising at least one means for performing the method of one or more of Aspects 30-57.

Aspect 66: A non-transitory computer-readable medium storing code for wireless communication, the code comprising instructions executable by a processor to perform the method of one or more of Aspects 30-57.

Aspect 67: A non-transitory computer-readable medium storing a set of instructions for wireless communication, the set of instructions comprising one or more instructions that, when executed by one or more processors of a device, cause the device to perform the method of one or more of Aspects 30-57.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first network node for wireless communication, comprising:
one or more memories; and
one or more processors, coupled to the one or more memories, configured to:
receive a signal associated with a set of resources;
determine, using a multi-head machine learning model having a body module and a plurality of head modules, a plurality of estimated parameter values of a plurality of parameters corresponding to the set of resources,
wherein the
multi-head machine learning model is trained based at least in part on:
providing each estimated parameter value, of multiple estimated parameter values, as input to a respective local loss module;
determining, using each respective local loss module, a local loss associated with a respective estimated parameter value;
determining a total loss associated with the multi-head machine learning model based at least in part on a weighted sum of the local loss of each respective local loss module; and
providing the total loss as input to the multi-head machine learning model; and
perform a wireless communication operation based at least in part on the plurality of estimated parameter values.

2. The first network node of claim 1, wherein the set of resources comprises at least one of a time domain resource, a frequency domain resource, an angular domain resource, or a spatial domain resource.

3. The first network node of claim 1, wherein each head module of the plurality of head modules generates only one estimated parameter value of the plurality of estimated parameter values.

4. The first network node of claim 1, wherein the plurality of estimated parameter values comprises at least one of an estimated parameter value associated with a current resource of the set of resources or a predicted parameter value associated with a future resource of the set of resources.

5. The first network node of claim 1, wherein a head module of the plurality of head modules generates an estimated parameter value of the plurality of estimated parameter values based at least in part on minimizing a loss function associated with a parameter of the plurality of parameters.

6. The first network node of claim 1, wherein the one or more processors are further configured to receive a machine learning configuration that configures weights associated with the local loss of each respective local loss module.

7. The first network node of claim 1, wherein the multi-head machine learning model comprises a neural network.

8. The first network node of claim 7, wherein a head module of the plurality of head modules comprises a single machine learning neuron, a single layer of multiple machine learning neurons, or a plurality of layers, each layer including at least one machine learning neuron.

9. The first network node of claim 1, wherein the plurality of estimated parameter values comprises a plurality of estimated interference distributions associated with a plurality of resources of the set of resources, wherein the set of common features comprises a set of interference features common to the plurality of resources.

10. The first network node of claim 1, wherein the plurality of estimated parameter values comprises:
a plurality of values associated with a set of estimated channel state information parameter values, at least one estimated channel state information parameter value and at least one estimated interference parameter value, or
a plurality of predicted reference signal received power values corresponding to a plurality of beams.

11. The first network node of claim 1, wherein the set of model inputs are based at least in part on at least one reference signal.

12. The first network node of claim 11, wherein the plurality of estimated parameter values comprises a first estimated parameter value corresponding to a first parameter and a second estimated parameter value corresponding to a second parameter that is different than the first parameter, wherein the first estimated parameter value is based at least in part on the at least one reference signal, and wherein the second estimated parameter value is based at least in part on the at least one reference signal.

13. The first network node of claim 11, wherein the plurality of estimated parameter values comprises a first estimated parameter value corresponding to a parameter in connection with a first resource and a second estimated parameter value corresponding to the parameter in connection with a second resource that is different than the first resource, wherein the first estimated parameter value is based at least in part on the at least one reference signal, and wherein the second estimated parameter value is based at least in part on the at least one reference signal.

14. The first network node of claim 1, wherein the one or more processors are further configured to receive a machine learning configuration that configures at least one of:
a head module of the plurality of head modules,
a quantity of head modules associated with the multi-head machine learning model, or
a parameter, of the plurality of parameters, corresponding to a head module of the plurality of head modules.

15. The first network node of claim 1, wherein the one or more processors are further configured to receive a machine learning configuration that configures a resource granularity associated with the set of resources at a head module of the plurality of head modules.

16. The first network node of claim 1, wherein the multi-head machine learning model comprises at least one additional head module, wherein the one or more processors are further configured to receive a head module deactivation indication associated with the at least one additional head module, and wherein the plurality of head modules excludes the at least one additional head module.

17. The first network node of claim 1, wherein the one or more processors are further configured to:
transmit, to a second network node, a capability report that indicates a capability associated with the multi-head machine learning model; and
receive, from the second network node and based at least in part on the capability report, a machine learning configuration associated with the multi-head machine learning model.

18. The first network node of claim 17, wherein the capability report indicates at least one of:
implementation of the multi-head machine learning model, or
a maximum quantity of head modules associated with the multi-head machine learning model.

19. The first network node of claim 1, wherein the one or more processors are further configured to transmit an output report that indicates at least one of the plurality of estimated parameter values.

20. A first network node for wireless communication, comprising:
one or more memories; and
one or more processors, coupled to the one or more memories, configured to:
transmit, to a second network node, a machine learning configuration associated with a multi-head machine learning model having a body module and a plurality of head modules,
wherein the multi-head machine learning model is configured to determine a plurality of estimated parameter values of a plurality of parameters corresponding to a set of resources, and wherein the
multi-head machine learning model is trained based at least in part on:
providing each estimated parameter value, of multiple estimated parameter values, as input to a respective local loss module;
determining, using each respective local loss module, a local loss associated with a respective estimated parameter value;
determining a total loss associated with the multi-head machine learning model based at least in part on a weighted sum of the local loss of each respective local loss module; and
providing the total loss as input to the multi-head machine learning model; and
receive, from the second network node, an output report that indicates at least one of the plurality of estimated parameter values.

21. The first network node of claim 20, wherein the set of resources comprises at least one of a time domain resource, a frequency domain resource, an angular domain resource, or a spatial domain resource.

22. The first network node of claim 20, wherein the multi-head machine learning model comprises a neural network.

23. The first network node of claim 20, wherein the machine learning configuration further configures at least one of:
a head module of the plurality of head modules,
a quantity of head modules associated with the multi-head machine learning model,
a parameter, of the plurality of parameters, corresponding to a head module of the plurality of head modules,
a resource granularity associated with the set of resources at a head module of the plurality of head modules, or
a weight associated with a loss function associated with the plurality of parameters.

24. The first network node of claim 20, wherein the multi-head machine learning model comprises at least one additional head module, and wherein the one or more processors are further configured to transmit a head module deactivation indication associated with the at least one additional head module, and wherein the plurality of head modules excludes the at least one additional head module.

25. The first network node of claim 20, wherein the one or more processors are further configured to receive, from the second network node, a capability report that indicates a capability associated with the multi-head machine learning model, and wherein the one or more processors, to transmit the machine learning configuration, are configured to transmit the machine learning configuration based at least in part on the capability report.

26. A method of wireless communication performed by a first network node, comprising:
receiving a signal associated with a set of resources;

determining, using a multi-head machine learning model having a body module and a plurality of head modules, a plurality of estimated parameter values of a plurality of parameters corresponding to the set of resources, wherein the multi-head machine learning model is trained based at least in part on:
- providing each estimated parameter value, of multiple estimated parameter values, as input to a respective local loss module;
- determining, using each respective local loss module, a local loss associated with a respective estimated parameter value;
- determining a total loss associated with the multi-head machine learning model based at least in part on a weighted sum of the local loss of each respective local loss module; and
- providing the total loss as input to the multi-head machine learning model; and performing a wireless communication operation based at least in part on the plurality of estimated parameter values.

27. The method of claim 26, further comprising receiving a machine learning configuration that configures at least one of:
- a head module of the plurality of head modules,
- a quantity of head modules associated with the multi-head machine learning model,
- a parameter, of the plurality of parameters, corresponding to a head module of the plurality of head modules, or
- a resource granularity associated with the set of resources at a head module of the plurality of head modules.

28. The method of claim 26, further comprising:
receiving a machine learning configuration that configures weights associated with the local losses.

29. A method of wireless communication performed by a first network node, comprising:
transmitting, to a second network node, a machine learning configuration associated with a multi-head machine learning model having a body module and a plurality of head modules,
wherein the multi-head machine learning model is configured to determine a plurality of estimated parameter values of a plurality of parameters corresponding to a set of resources, and wherein the multi-head machine learning model is trained based at least in part on:
- providing each estimated parameter value, of multiple estimated parameter values, as input to a respective local loss module;
- determining, using each respective local loss module, a local loss associated with a respective estimated parameter value;
- determining a total loss associated with the multi-head machine learning model based at least in part on a weighted sum of the local losses; and
- providing the total loss as input to the multi-head machine learning model; and receiving, from the second network node, an output report that indicates at least one of the plurality of estimated parameter values.

30. The method of claim 29, wherein the multi-head machine learning model comprises at least one additional head module, the method further comprising transmitting a head module deactivation indication associated with the at least one additional head module, and wherein the plurality of head modules excludes the at least one additional head module.

* * * * *